US010442689B2

(12) United States Patent
Chun

(10) Patent No.: US 10,442,689 B2
(45) Date of Patent: Oct. 15, 2019

(54) MICROWAVE REFORMING APPARATUS FOR GAS REFORMING

(71) Applicant: INDUSTRY-ACADEMIC COOPERATION FOUNDATION CHOSUN UNIVERSITY, Gwangju (KR)

(72) Inventor: Young-Nam Chun, Gwangju (KR)

(73) Assignee: Industry-Academic Cooperation Foundation Chosun University (KR)

( * ) Notice: Subject to any disclaimer, the term of this patent is extended or adjusted under 35 U.S.C. 154(b) by 154 days.

(21) Appl. No.: 15/821,568

(22) Filed: Nov. 22, 2017

(65) Prior Publication Data

US 2018/0265356 A1    Sep. 20, 2018

(30) Foreign Application Priority Data

Mar. 17, 2017 (KR) .................. 10-2017-0033504
Oct. 18, 2017 (KR) .................. 10-2017-0135123

(51) Int. Cl.
*C01B 3/38* (2006.01)
*C10J 3/84* (2006.01)
(Continued)

(52) U.S. Cl.
CPC .......... *C01B 3/38* (2013.01); *C01B 3/26* (2013.01); *C10B 53/02* (2013.01); *C10J 3/84* (2013.01); *C10K 3/003* (2013.01); *C01B 2203/0227* (2013.01); *C01B 2203/0238* (2013.01); *C01B 2203/0277* (2013.01); *C01B 2203/0855* (2013.01); *C01B 2203/1023* (2013.01);
(Continued)

(58) Field of Classification Search
None
See application file for complete search history.

(56) References Cited

U.S. PATENT DOCUMENTS 5,472,581 A * 12/1995 Wan ................. B01J 19/126
                                                   204/157.43
2011/0136923 A1 * 6/2011 Cha .................. B01D 17/00
                                                   516/138

OTHER PUBLICATIONS

Xu, Long et al., "Catalytic CH4 reforming with CO2 over activated carbon based catalysts," Applied Catalysis A: General 469:387-397, 2014.

* cited by examiner

Primary Examiner — Kishor Mayekar
(74) Attorney, Agent, or Firm — JHK Law; Joseph Hyosuk Kim

(57) ABSTRACT

The present disclosure relates to a microwave reforming apparatus for gas reforming, and provides a new technology of converting carbon dioxide which is a main greenhouse gas generated during combustion, pyrolysis/gasification, and operation of fossil fuels, methane, and dispersions thereof into high-quality fuels. A microwave reforming apparatus according to the present disclosure uses a carbon receptor and thus can solve the conventional problem of price of catalyst and also enables compactification of a device, rapid startup and response time in several seconds, and application of various kinds of product gases including polymer hydrocarbon. Also, the microwave reforming apparatus according to the present disclosure uses its own internal reaction heat at the time of reforming and thus can maintain the optimum operating conditions for a wide range of flow rate and gas properties. Therefore, it is possible to solve the conventional problem with the time required for normal operation and the efficiency of a reforming apparatus.

16 Claims, 16 Drawing Sheets

(51) Int. Cl.
 *C10B 53/02* (2006.01)
 *C10K 3/00* (2006.01)
 *C01B 3/26* (2006.01)
(52) U.S. Cl.
 CPC ............... *C01B 2203/1041* (2013.01); *C01B 2203/1241* (2013.01); *C01B 2203/1247* (2013.01); *C10J 2300/094* (2013.01); *C10J 2300/0916* (2013.01); *C10J 2300/0946* (2013.01); *Y02E 50/14* (2013.01)

[FIG. 1]
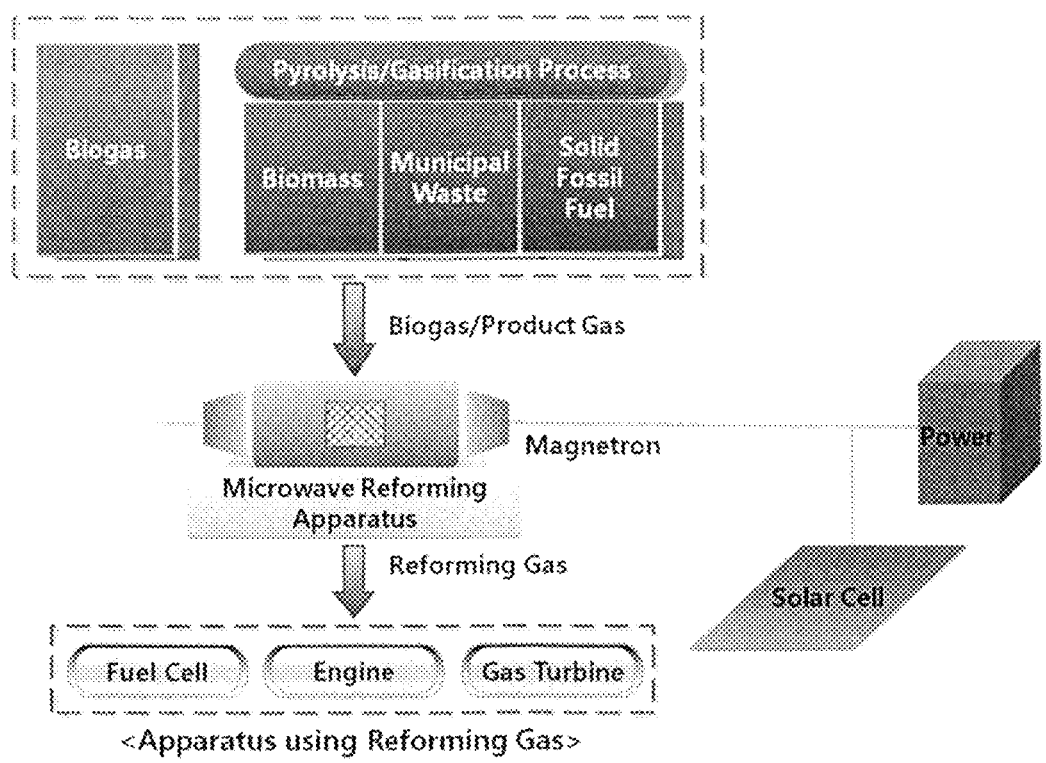

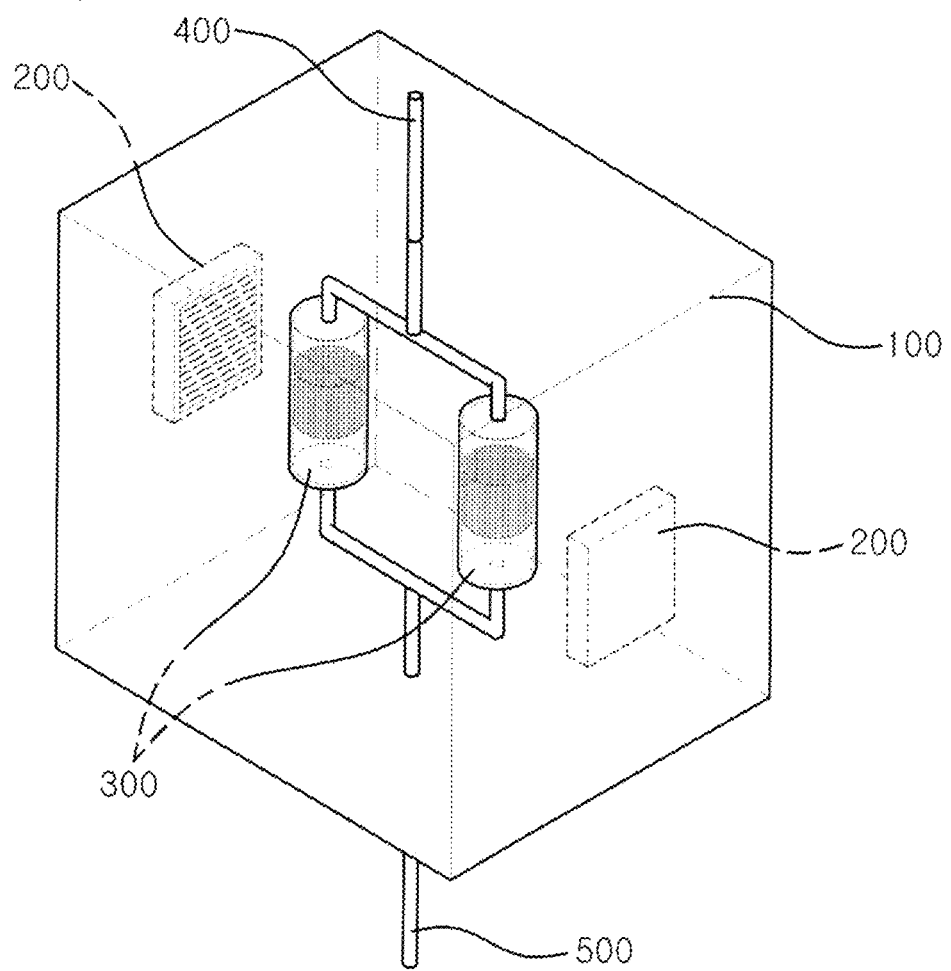

[FIG. 3]
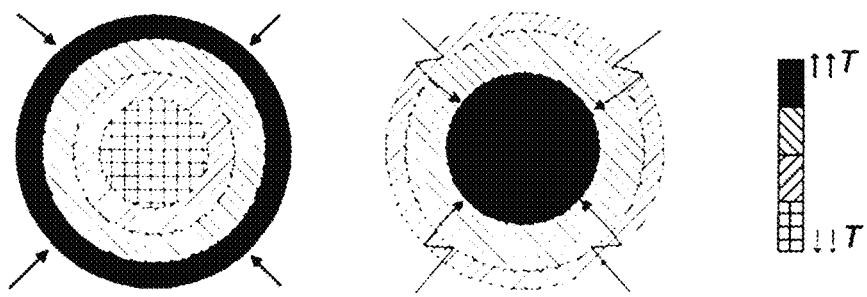
(a) Conventional Heating Method  (b) Microwave Heating Method
[FIG. 4]
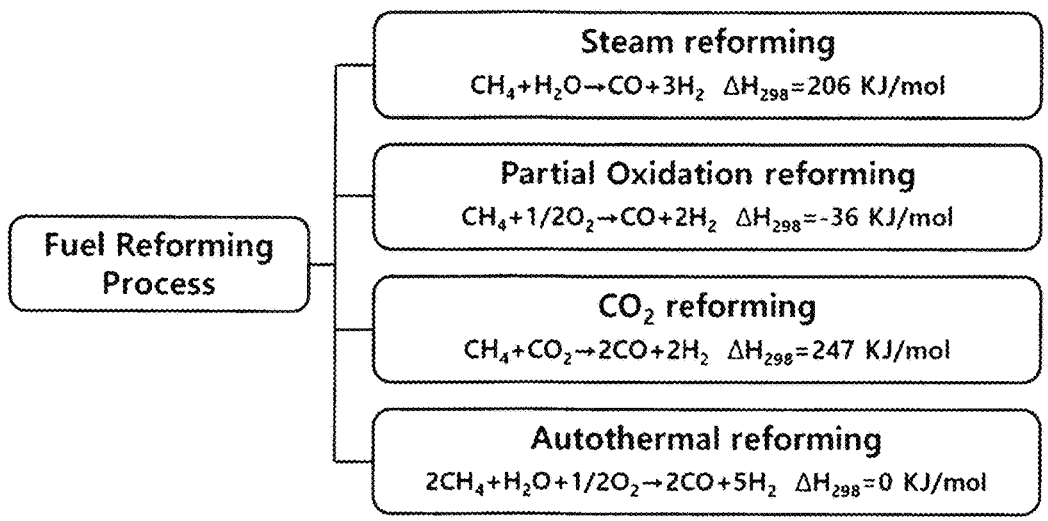

[FIG. 5]
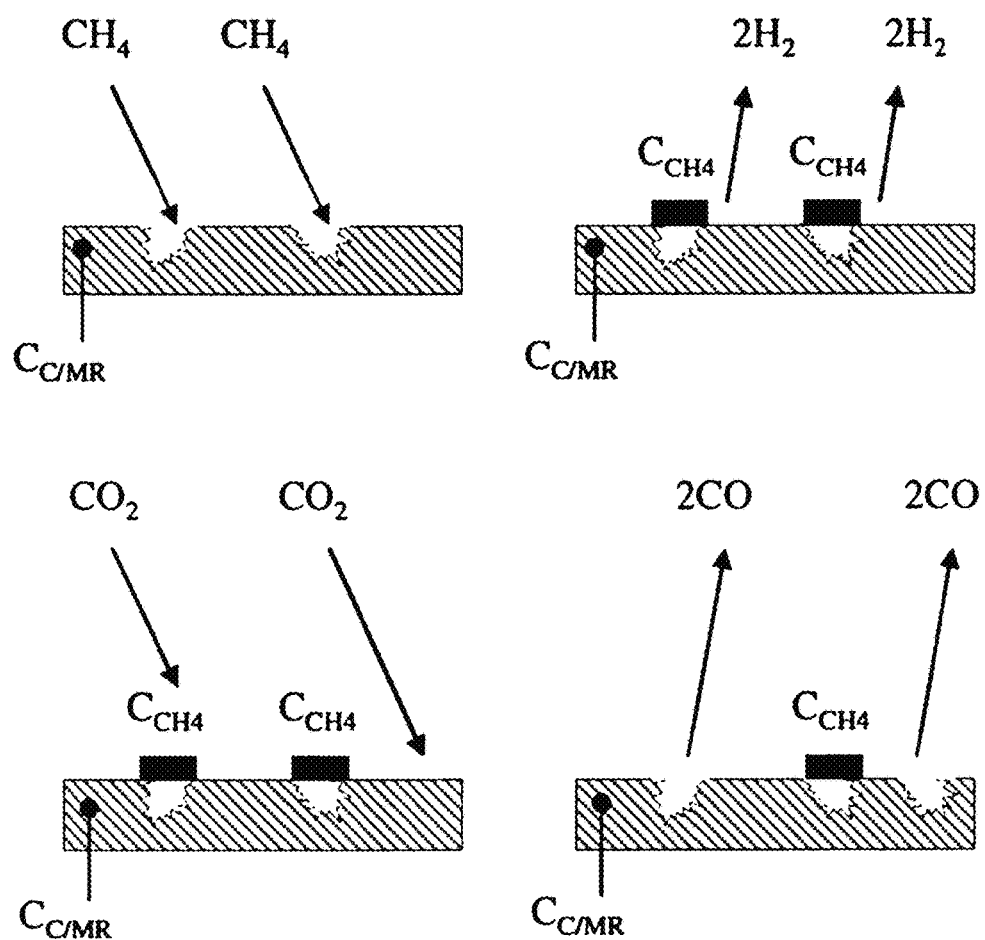

[FIG. 6]
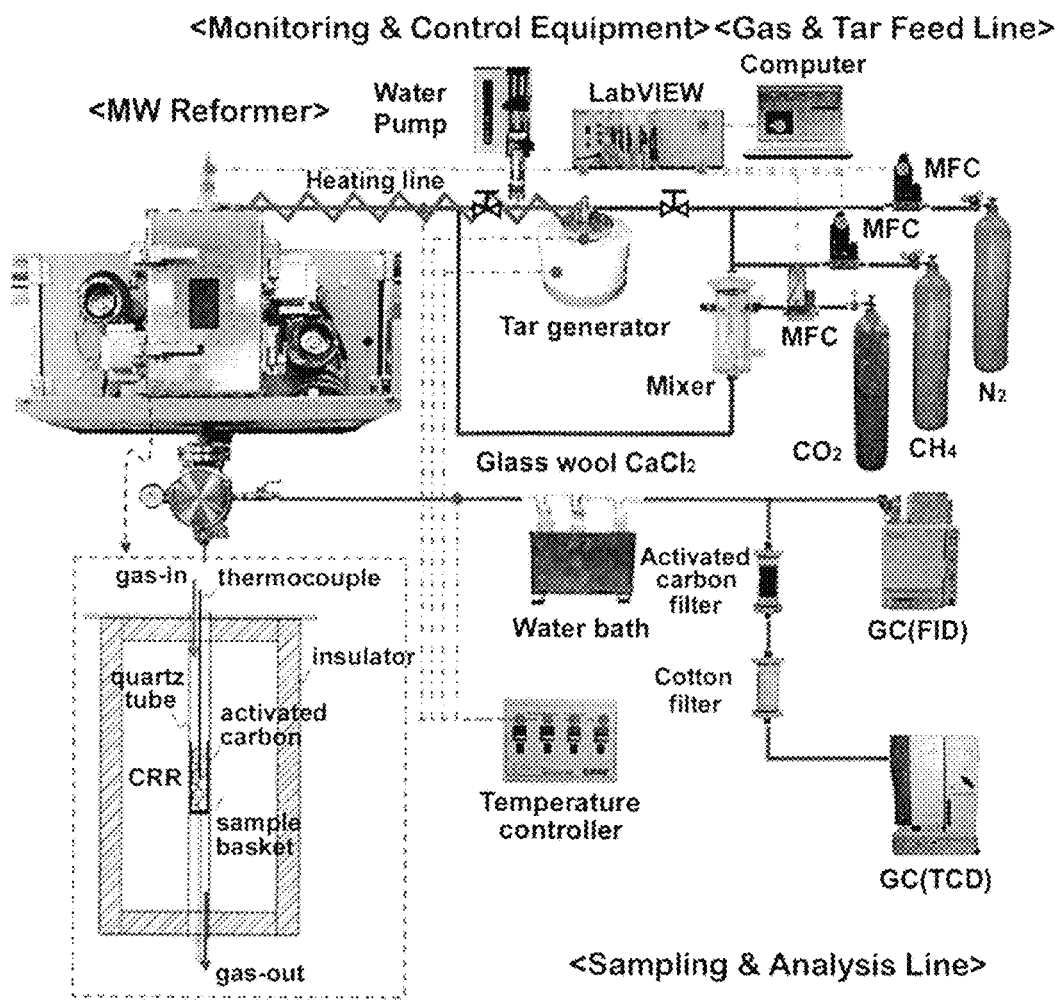

[FIG. 7]
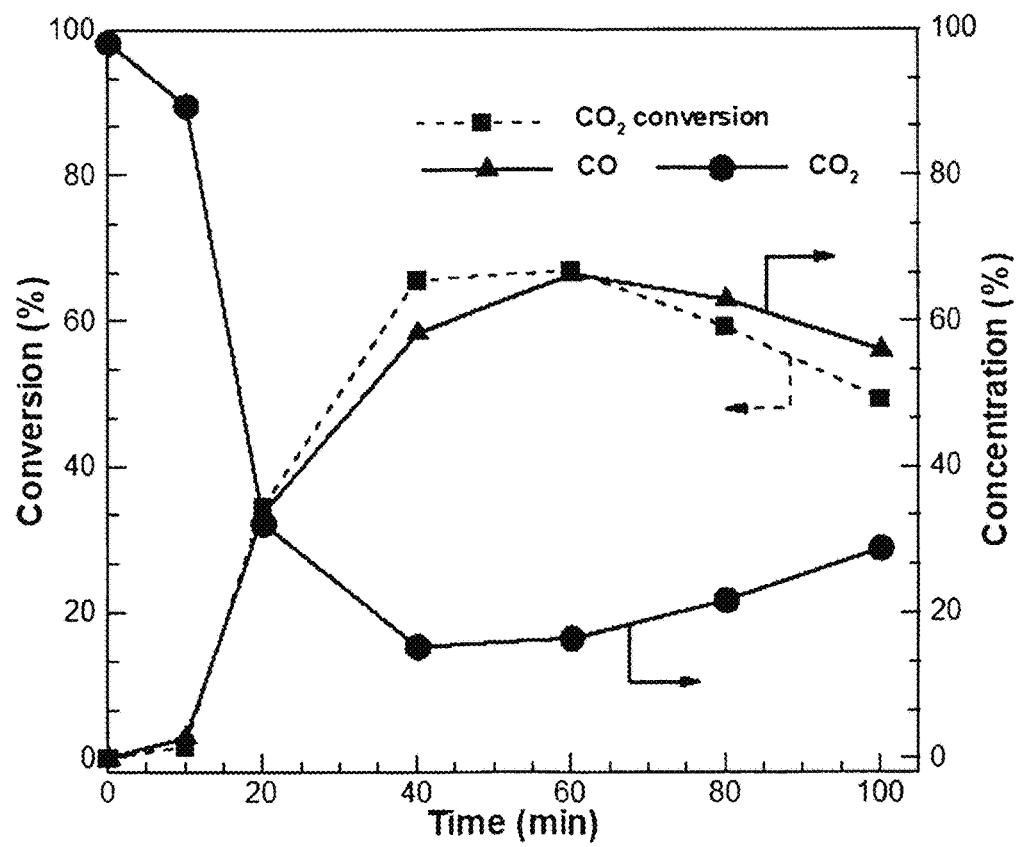

[FIG. 8]
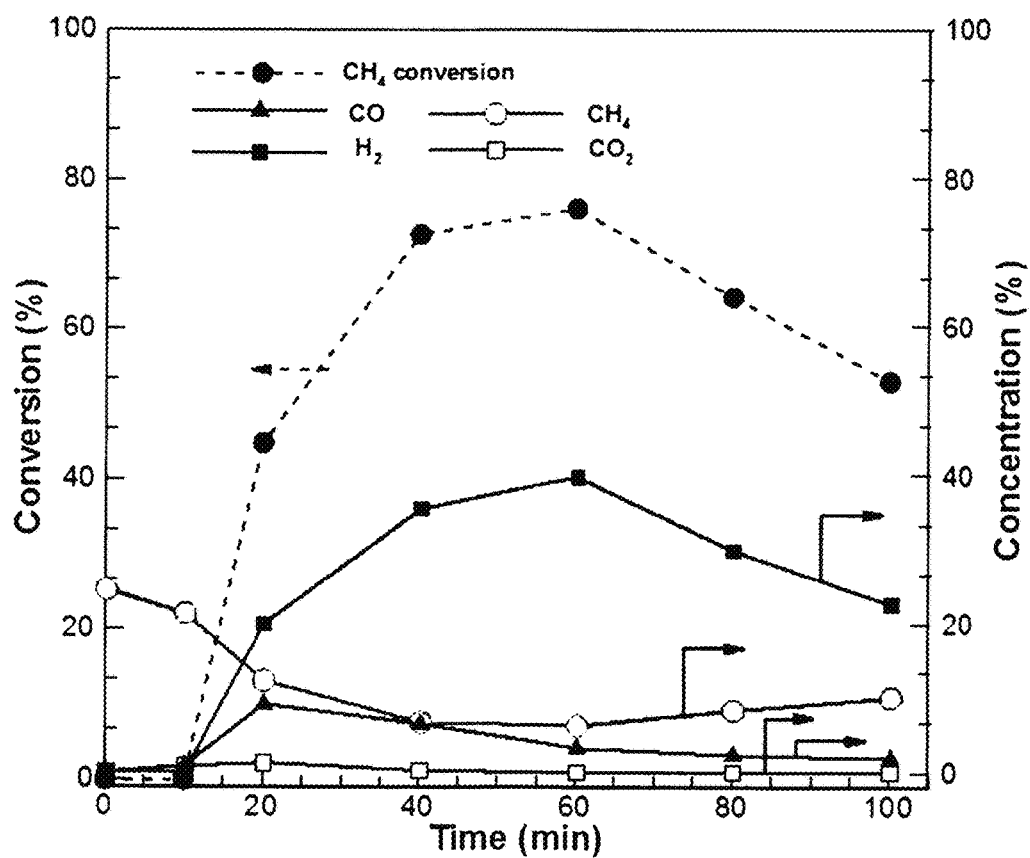

[FIG. 9]
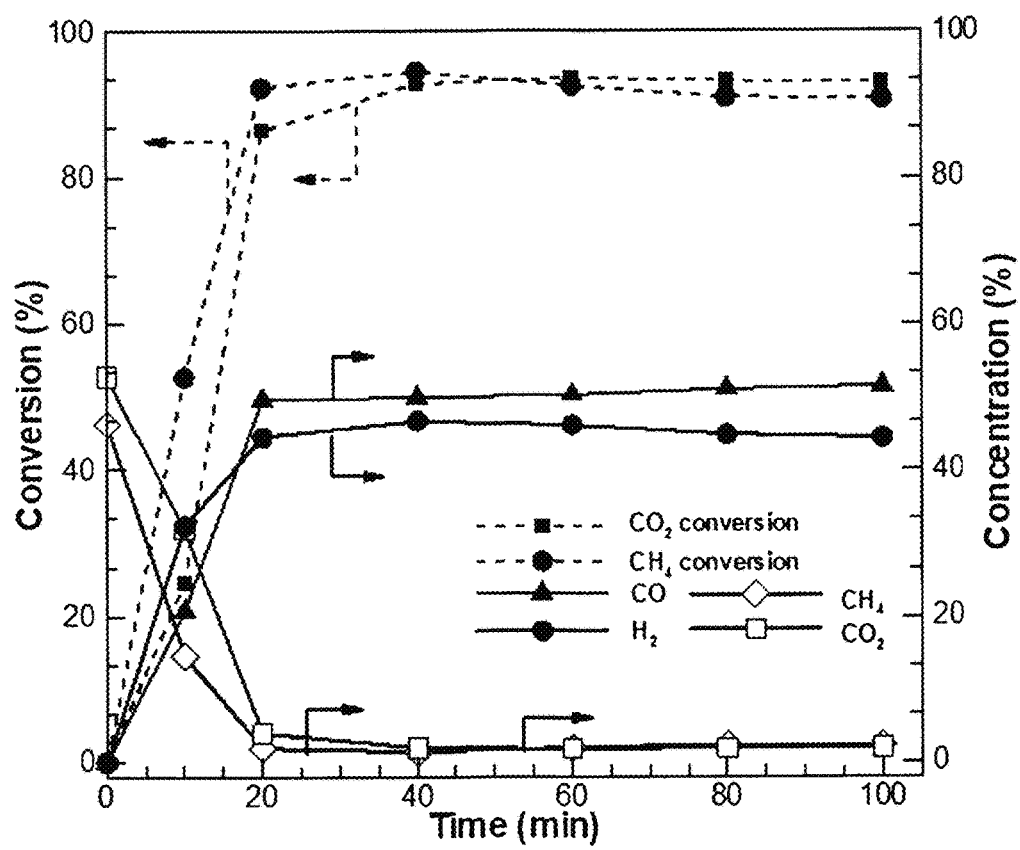

[FIG. 10]
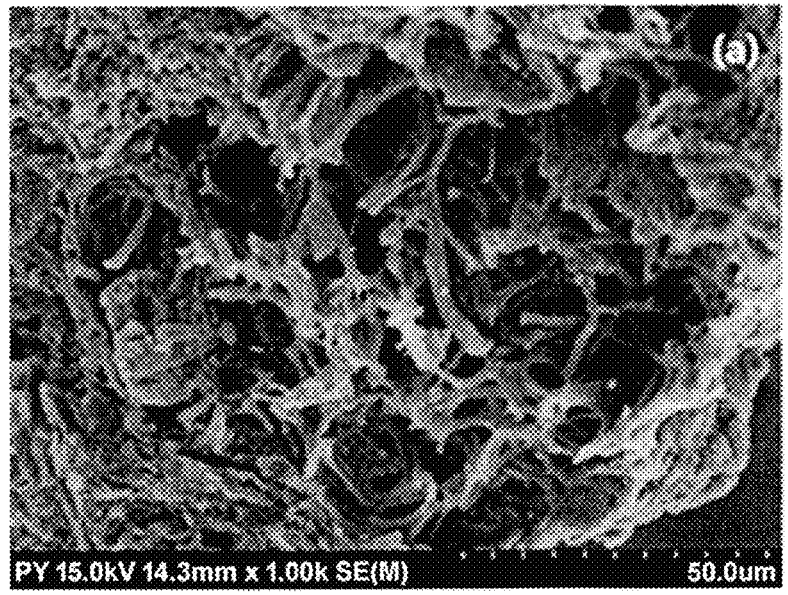
(a) Before MW Reforming
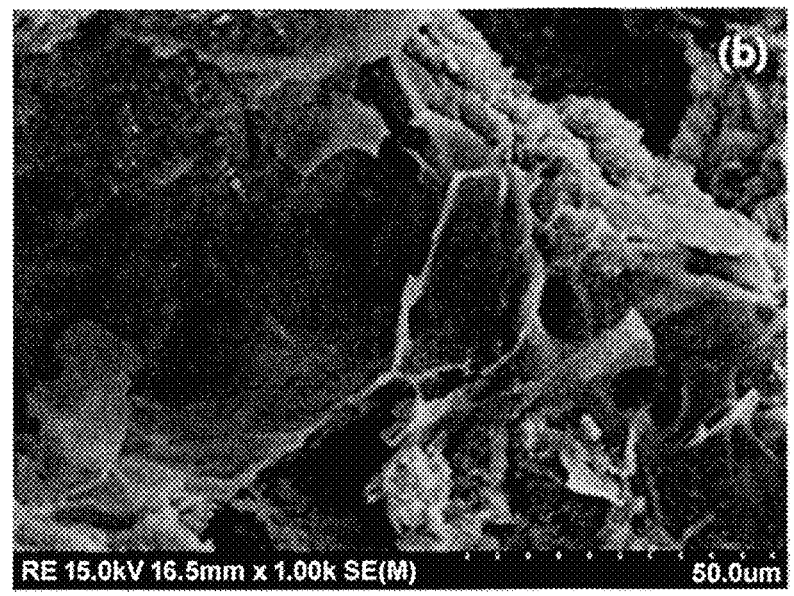
(b) After MW Reforming

[FIG. 11]
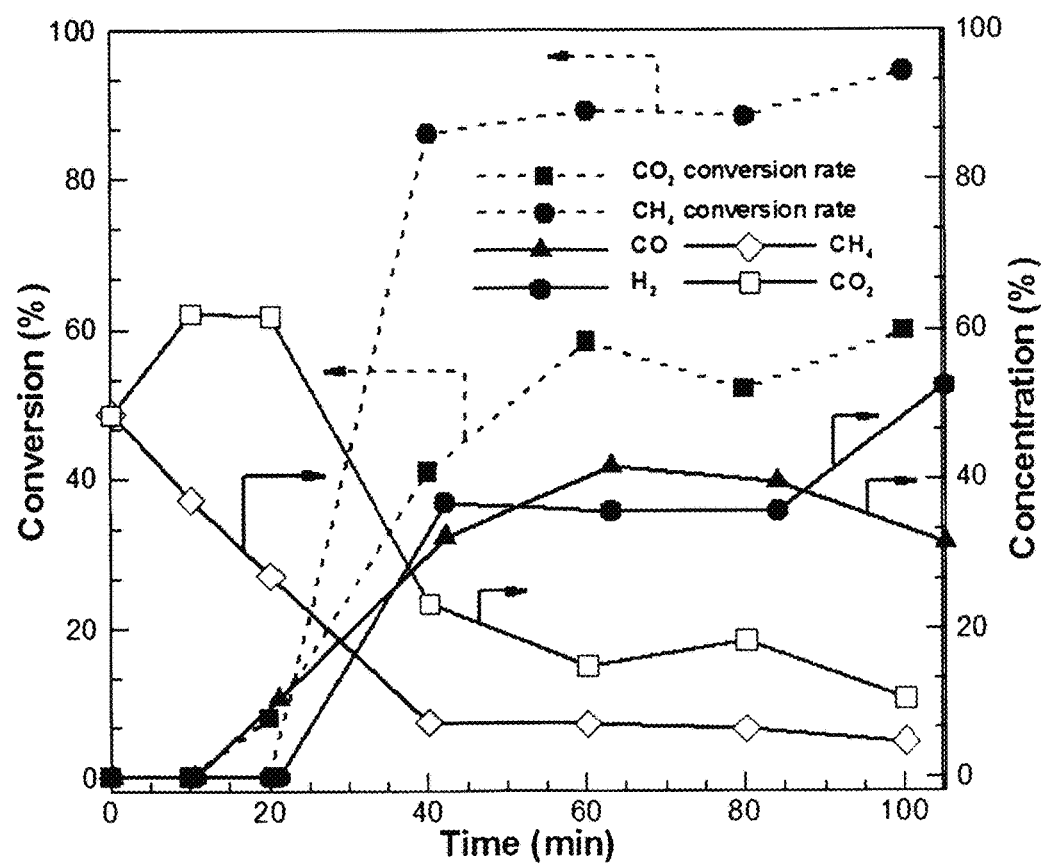

[FIG. 12]
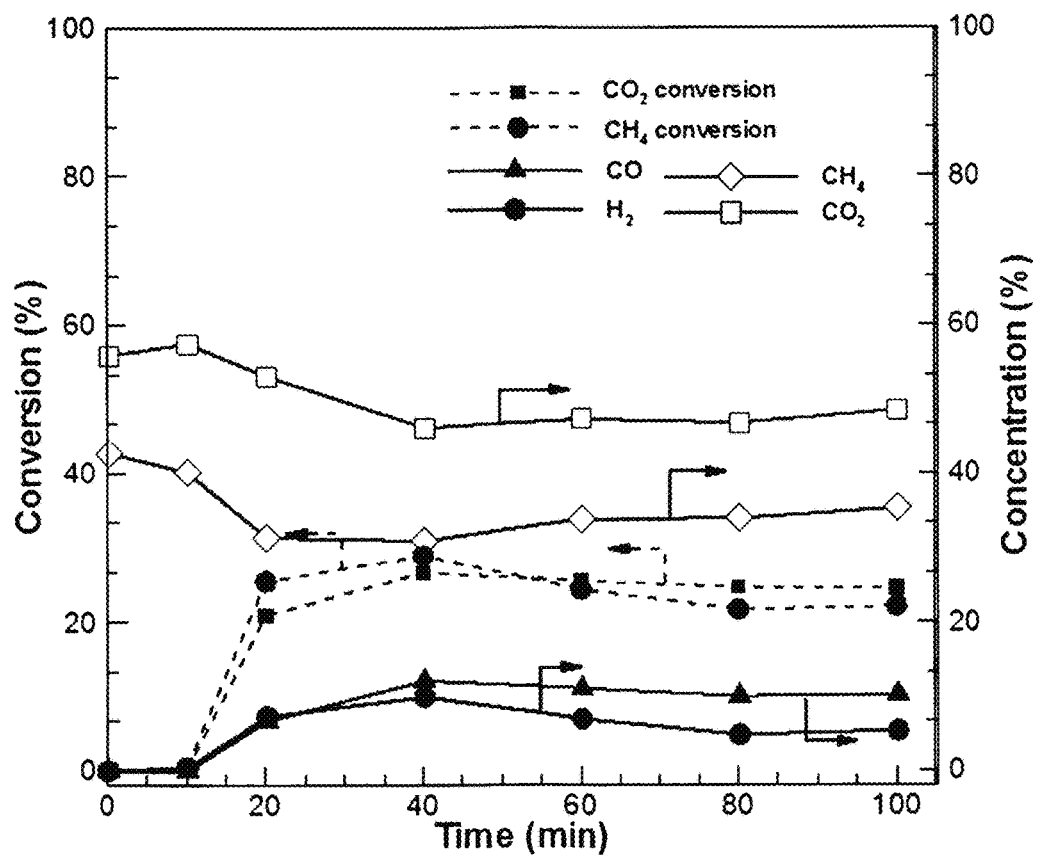

[FIG. 13]
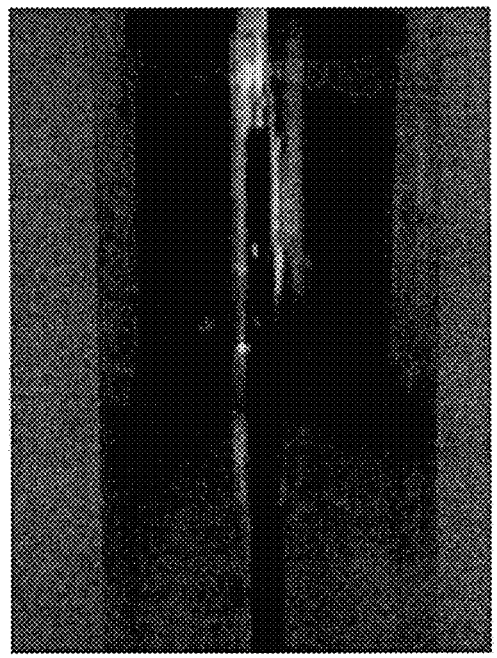

[FIG. 14]
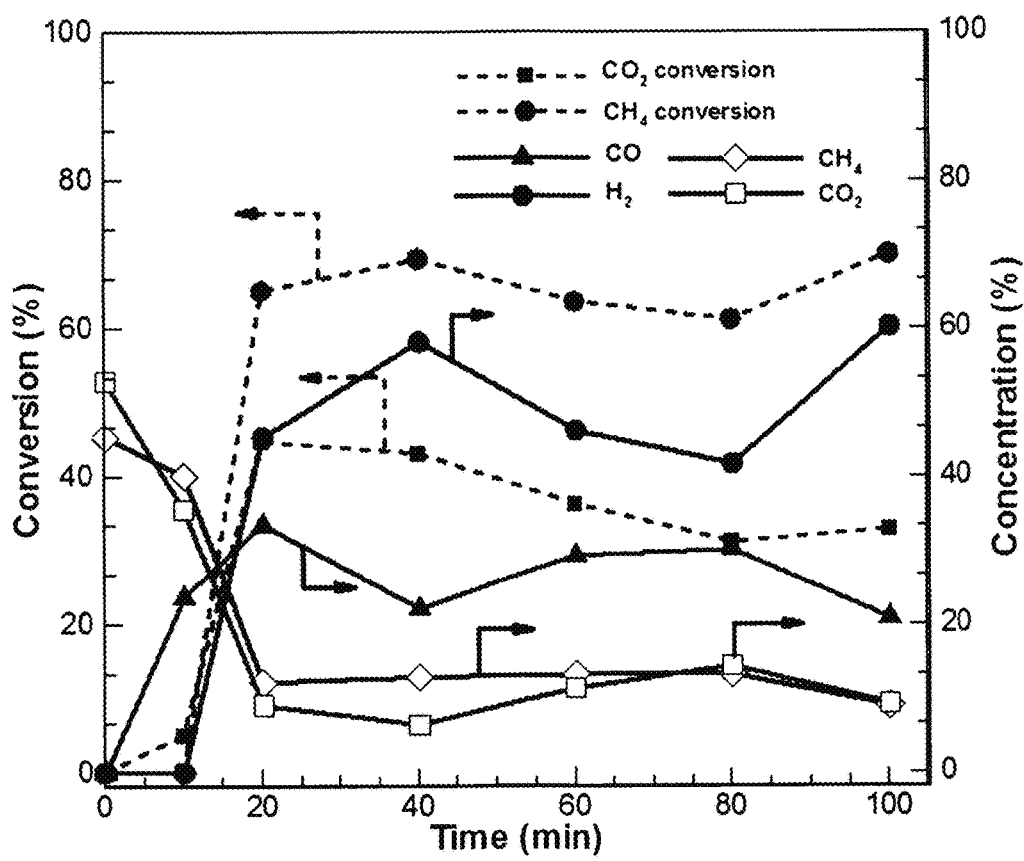

[FIG. 15]
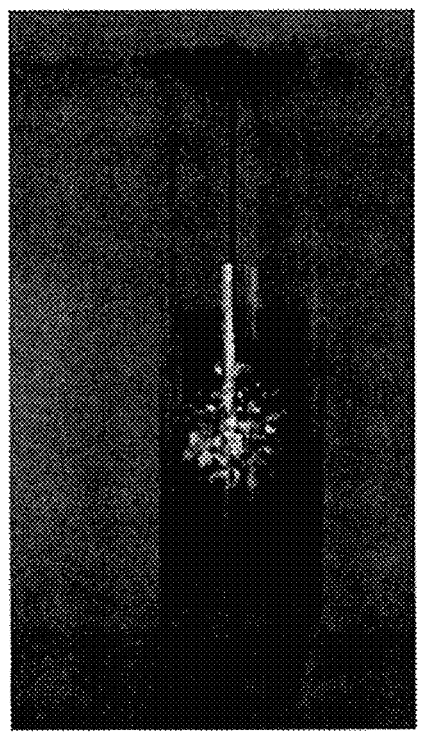

[FIG. 16]
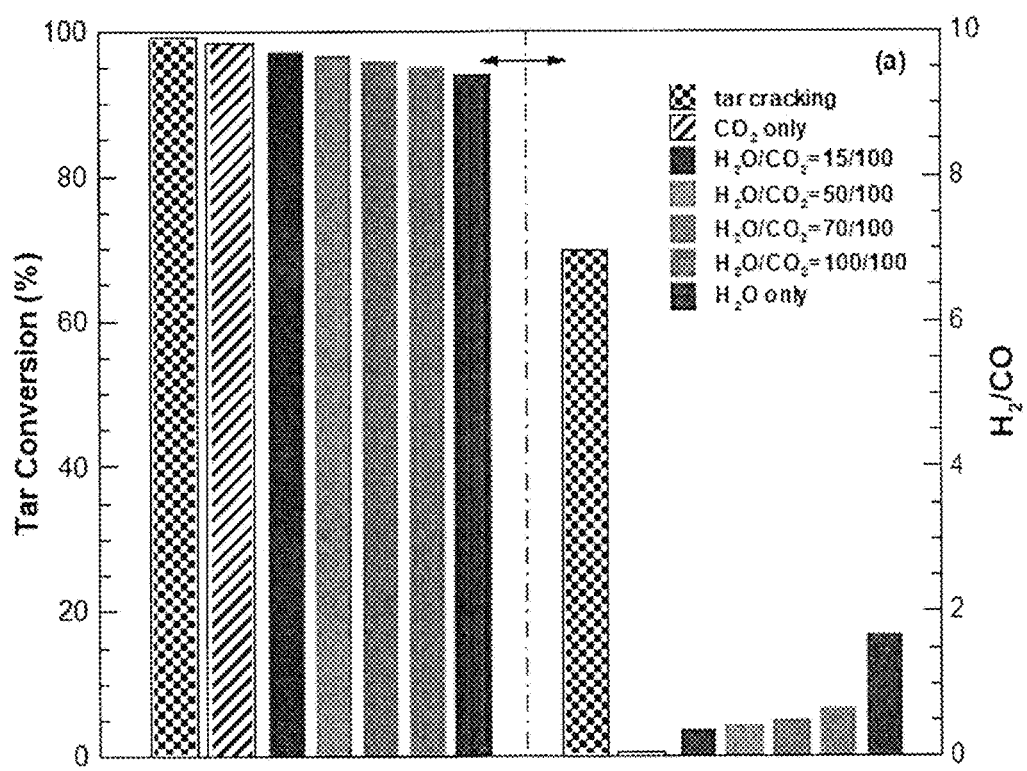

[FIG. 17]
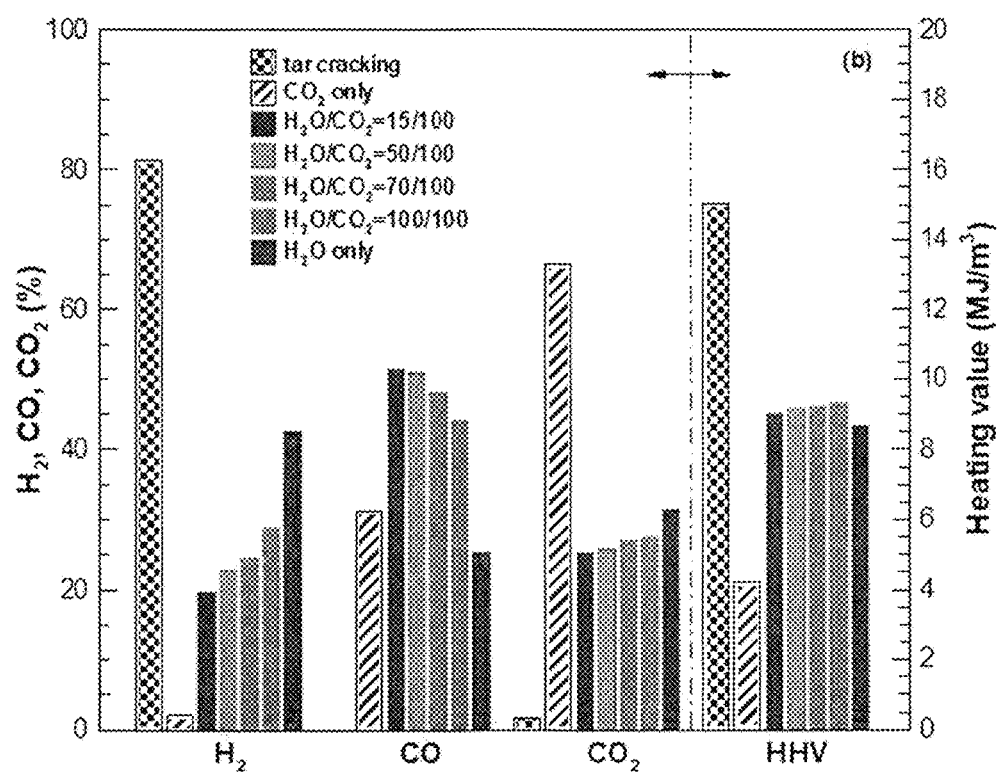

MICROWAVE REFORMING APPARATUS FOR GAS REFORMING

CROSS-REFERENCE TO RELATED APPLICATIONS

This application is based on and claims priority from Korean Patent Application No. 10-2017-0033504 and 10-2017-0135123, filed on Mar. 17, 2017 and Oct. 18, 2017 with the Korean Intellectual Property Office, the disclosure of which is incorporated herein in its entirety by reference.

TECHNICAL FIELD

The present disclosure relates to a microwave reforming apparatus for gas reforming.

BACKGROUND

Fossil fuels, biomass, waste pyrolysis/gasification gas, biogas, and the like have methane ($CH_4$) and carbon dioxide ($CO_2$) for their main ingredients, and these two gases are greenhouse gases known as main causative materials of climate change. The reforming technology for converting these greenhouse gases into a high-quality fuel has received attention and has been studied continuously. Methane steam reforming ($CH_4+H_2O \leftrightarrow CO+3H_2$) has already been applied in the industry. However, recently, methane dry reforming ($CH_4+CO_2 \leftrightarrow 2CO+2H_2$) has been recognized as a more attractive method due to reduction of greenhouse gas and effective chemical conversion energy.

In order to convert methane and carbon dioxide into hydrogen or carbon monoxide, high-temperature reaction conditions need to be satisfied or an appropriate help of catalyst is needed. In order to overcome this problem, a new catalyst excellent in reforming conversion reaction without carbon deposition has recently been developed. A catalyst formed of a noble metal or transition metal having a high catalytic ability has been widely used. However, a noble metal catalyst is too expensive and a transition metal catalyst is subject to deterioration in catalytic ability due to catalytic deactivation caused by carbon deposition.

In recent years, basic studies on $CH_4$—$CO_2$ reforming using various kinds of carbon materials are being conducted. Such carbon materials are typically used as a catalyst or catalyst carrier, and activated carbon, coal char, semi-coke and bio-char are mainly used. These studies have been widely conducted about a carbon material itself, the catalytic activity of modified carbon-containing catalyst, and reforming reaction characteristics for each different operating condition. A carbon material-based catalyst is cheaper than conventional catalysts and has high catalytic activity and rarely has the sulfur poisoning problem.

Bio-char which is a carbide produced by pyrolysis of biomass can be used as a source for combustion, gasification or activated carbon. There has been a lot of attention on the production of a synthetic gas by gasification of bio-char. If bio-char is used in methane reforming, gasification of bio-char is an essential process. Therefore, a study on carbon gasification in a reforming reaction is very significant. However, there is barely any in-depth technology on this field.

A microwave heating method is excellent in energy efficiency as compared with a conventional hot-air or electrical heating method and has thermal characteristics of being excellent in rapid heating, selective heating, and homogenous heating. So far, the microwave heating method has been widely applied to reduction of environmental pollutants, pyrolysis/gasification of biomass, and drying of materials.

Recently, the microwave heating method has been applied to the above-described methane dry reforming of a carbon-based catalyst. Such studies confirmed that a carbon material is an excellent microwave receptor and has a higher gas reforming conversion rate than the conventional heating methods. Further, it was reported that the selectivity of a product gas is improved and the carbon deposition is reduced. However, technology about a reforming apparatus using carbide as a microwave receptor has not been developed.

The conventional heating methods are affected by conduction and convection of a material and have slow heat transfer and low heating efficiency since an object is heated from the surface to the inside. On the other hand, dielectric heating such as microwave heating converts electromagnetic energy into heat energy, and, thus, it is a kind of energy conversion rather than heating. That is, as illustrated in FIG. 3, microwaves pass through a target object and then are stored as energy in the target object and converted into heat therein, and, thus, heating is conducted and a temperature at the center is higher than that on the surface.

There have been known three mechanisms for enhancing chemical reaction when a microwave (MW) irradiation technique. The first is a thermal effect by which high-temperature reaction of a polar material irradiated with microwaves is increased, the second is a specific MW effect by which reaction activity is improved by microwave internal transfer core volumetric heating unlike conventional simple surface heating as described above, and the third is a non-thermal effect which is a chemical transformation acceleration effect on vibration of chemical species when microwaves are irradiated.

Technology of converting a biogas or product gas into a high-grade reforming gas can be roughly classified into steam reforming, $CO_2$ reforming, oxygen reforming, and autothermal reforming in terms of reaction as illustrated in FIG. 4.

The steam reforming refers to a method of reforming by injecting overheated steam into a reforming apparatus. In this case, the reforming apparatus is large and a reaction rate is relatively low. However, due to its advantages such as the amount of gas processed and a high hydrogen production yield rate, the steam reforming is most commonly used.

The $CO_2$ reforming is getting attention in terms of the use of energy conversion of greenhouse gas. In terms of economics of preparing a synthetic gas, $CO_2$ reforming of methane has been evaluated as being equivalent to steam reforming of methane.

The oxygen reforming refers to reforming via incomplete combustion of a fuel and its whole reaction is operated as an exothermic reaction. The amounts of air and oxygen are determined by reactive equivalents, and a partial oxidation process is a high-temperature exothermic reaction and maintains a temperature of a reactor to a very high level. This method does not require an indirect heat transfer apparatus and the whole process is simpler. Further, the oxygen reforming is rapid in exothermic reaction and initial startup and excellent in load response.

The autothermal reforming is a complex reaction of steam reforming and partial oxidation reaction and an appropriate mix of the advantage of maintaining an appropriate exothermic reaction in the partial oxidation reaction and the advantage of a great amount of hydrogen production in the steam reforming. Particularly, it is easy to select a material of a reactor and carbon deposition less occurs within a system as compared with the other reforming reactions.

As described above, the existing reforming processes have their own characteristics. The steam reforming requires high temperature (700 to 800° C.) and pressure (3 to 25 atm) and uses a catalyst to increase a hydrogen conversion rate, and this can be polluted by sulfur or nitrogen and shortened in lifetime. The $CO_2$ reforming needs to maintain a predetermined operating pressure (1 to 10 atm) of a reactor and requires an external heating source to maintain a temperature to about 400 to 1,000° C. due to high endothermic reaction (247 kJ/mol). Further, according to the oxygen reforming, it is not easy to obtain high-purity hydrogen due to nitrogen components in air used for combustion. Furthermore, in the autothermal reforming, when steam and air react with methane, it is difficult to control an internal temperature of a reforming apparatus.

A microwave reforming apparatus of the present disclosure uses a carbon receptor and thus uses its own internal reaction heat at the time of reforming. Therefore, it is excellent in time required for normal operation and efficiency.

PRIOR ART DOCUMENT (Non-Patent Document 1) Applied Catalysis A: General, Volume 469, 2014, Pages 387-397

SUMMARY

The present disclosure has been made in an effort to provide a microwave reforming apparatus for gas reforming.

Also, the present disclosure has been made in an effort to provide a method for reforming a gas.

Further, the present disclosure has been made in an effort to provide a gas reforming system.

Furthermore, the present disclosure has been made in an effort to provide a method for reforming tar in a tar-containing gas.

An exemplary embodiment of the present disclosure provides a microwave reforming apparatus for gas reforming, including: a microwave cavity chamber; one or more magnetrons provided on an internal wall surface of the microwave cavity chamber; a power supply unit connected to the magnetron; one or more carbon receptor reactors positioned within the microwave cavity chamber; an injecting gas supply unit communicating with an upper part of the carbon receptor reactor; and a reforming gas discharge unit communicating with a lower part of the carbon receptor reactor.

Another exemplary embodiment of the present disclosure provides a method for reforming a gas, including: supplying an injecting gas together with an inert gas to the microwave reforming apparatus according to the present disclosure (process 1); and obtaining a reforming gas by irradiating microwaves from the microwave reforming apparatus and reforming the supplied injecting gas (process 2).

Yet another exemplary embodiment of the present disclosure provides a gas reforming system including: a gas supply unit configured to supply a product gas or a biogas generated when a source material including biomass, organic waste, and fossil fuel is pyrolyzed or gasified; and a gas reforming unit including the microwave reforming apparatus according to the present disclosure and configured to communicate with the gas supply unit.

Still another exemplary embodiment of the present disclosure provides a method for reforming tar in a tar-containing gas, including: pyrolyzing or gasifying fossil fuel, biomass, or organic waste (process 1); supplying a tar-containing gas produced in the process 1 to the microwave reforming apparatus according to the present disclosure (process 2); and reforming tar in the supplied tar-containing gas into one or more gases selected from the group consisting of hydrogen, carbon monoxide or a light hydrocarbon gas by irradiating microwaves from the microwave reforming apparatus (process 3).

According to the exemplary embodiments of the present disclosure, there is provided a new technology of converting carbon dioxide which is a main greenhouse gas generated during combustion, pyrolysis/gasification, and operation of fossil fuels, methane, and dispersions thereof into high-quality fuels. A microwave reforming apparatus according to the present disclosure uses a carbon receptor and thus can solve the conventional problem of price of catalyst and also enables compactification of a device, rapid startup and response time in several seconds, and application of various kinds of product gases including polymer hydrocarbon. Also, the microwave reforming apparatus according to the present disclosure uses its own internal reaction heat at the time of reforming and thus can maintain the optimum operating conditions for a wide range of flow rate and gas properties. Therefore, it is possible to solve the conventional problem with the time required for normal operation and the efficiency of a reforming apparatus.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a configuration view illustrating the production and use of a microwave reforming gas.

FIG. 2 is a perspective view of a microwave reforming apparatus according to the present disclosure.

FIG. 3 is a comparison view of a microwave heating method with a conventional heating method.

FIG. 4 is a diagram illustrating a fuel reforming process.

FIG. 5 is a schematic diagram illustrating a $CO_2$ removal mechanism of carbon present on a surface of a carbon receptor: $C_{CH4}$ refers to carbon produced from $CH_4$ and $C_{C/MR}$ refers to carbon present in the carbon receptor.

FIG. 6 illustrates an experimental system for microwave reforming according to the present disclosure.

FIG. 7 is a graph illustrating a $CO_2$ conversion rate obtained when sludge char is used as a carbon receptor and only $CO_2$ is reformed with microwaves.

FIG. 8 is a graph illustrating a $CH_4$ conversion rate obtained when sludge char is used as a carbon receptor and only $CH_4$ is reformed with microwaves.

FIG. 9 is a graph illustrating $CO_2$ and $CH_4$ conversion rates obtained when sludge char is used as a carbon receptor and a mixed gas of $CO_2$ and $CH_4$ is reformed with microwaves.

FIG. 10 illustrates SEM images obtained before and after microwave reforming of sludge char.

FIG. 11 is a graph illustrating $CO_2$ and $CH_4$ conversion rates obtained when activated carbon is used as a carbon receptor and a mixed gas of $CO_2$ and $CH_4$ is reformed with microwaves.

FIG. 12 illustrates a result of reforming a mixed gas of carbon dioxide and methane when a reforming temperature which is a temperature of a carbon receptor bed is set to 800° C.

FIG. 13 is a photo illustrating a carbon receptor bed and local generation of microplasma occurring at the time of reforming.

FIG. 14 illustrates a result of a mixed gas when a volumetric hourly space velocity of a carbon receptor bed layer is set to 0.9 L/gh.

FIG. 15 is a photo illustrating local generation of microplasma occurring in a carbon receptor.

FIG. 16 is a graph illustrating a tar conversion rate and a $H_2/CO$ ratio depending on a $CO_2$—$H_2O$ ratio for reduction of tar at the time of tar reforming using activated carbon as a carbon receptor.

FIG. 17 is a graph illustrating a concentration of a product gas and a higher heating value depending on a $CO_2$—$H_2O$ ratio for reduction of tar at the time of tar reforming using activated carbon as a carbon receptor.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

The present disclosure is one of methods for solving the problem of particulate materials, harmful gases, greenhouse gases, and the like, generated at the time of combustion of fossil fuels and affecting air pollution or climate change by using biomass and waste as renewable energy and is a technology advanced from pre-Combustion CCT (Carbon Capture Technology) which is a technology of capturing carbon before combustion of fossil fuels.

A target to be processed by the present disclosure includes landfill gases containing methane and carbon dioxide for their main ingredients, by-product gases in a digester at a waste water-disposal plant, biogases generated in an anaerobic reactor for disposal of food wastes, biomass such as rice straw and wood, municipal solid wastes which are combustible wastes, and hydrocarbon and carbon monoxide-based gases such as product gases generated by pyrolysis/gasification of solid fossil fuels such as coal.

A microwave reforming apparatus which is a core device of the present disclosure is used to convert such a biogas or product gas into a hydrogen-rich reforming gas known as a clean gas. In this case, steam may be supplied into the reforming apparatus to increase the yield rate of hydrogen or a carbon dioxide may be supplied into the reforming apparatus to convert a greenhouse gas into a fuel. The microwave reforming apparatus according to the present disclosure may be supplied with electricity generated from solar cells which is renewable energy, if possible, and may be supplemented with general electricity in terms of energy mix.

The reforming gas which is a high-grade clean gas may be used as a fuel for a fuel cell such as a solid oxide fuel cell (SOFC) and a combustor such as an engine or a gas turbine. In this case, as compared with a conventional method in which a reforming process is not performed, a discharge gas has little effect on air pollution and climate change and it is possible to improve combustion and heating efficiency (refer to FIG. 1).

Hereinafter, the present disclosure will be described in detail.

Microwave Reforming Apparatus for Gas Reforming

The present disclosure provides a microwave reforming apparatus for gas reforming, including: a microwave cavity chamber 100; one or more magnetrons 200 provided on an internal wall surface of the microwave cavity chamber; a power supply unit connected to the magnetron; one or more carbon receptor reactors 300 positioned within the microwave cavity chamber; an injecting gas supply unit 400 communicating with an upper part of the carbon receptor reactor; and a reforming gas discharge unit 500 communicating with a lower part of the carbon receptor reactor (refer to FIG. 2).

The microwave cavity chamber 100 has a multimode cavity in which microwaves radiated from the magnetron 200 are reflected on its wall surface. Therefore, a uniform electromagnetic field is formed within the cavity. There may be one or more magnetrons. For example, there may be 1 to 100 magnetrons.

The power supply unit may supply general electric power, solar electricity, renewable energy, and the like solely or in combination thereof.

The carbon receptor reactor 300 has a cylindrical shape or a square pillar shape (slot), and one or more carbon receptor reactors may be positioned in parallel at a predetermined distance from each other. For example, a quartz tube may be used, and any tube formed of a material that transmits microwaves can be used. In this case, preferably, the carbon receptor reactors may be disposed such that microwaves can be absorbed to carbon receptors as uniformly as possible depending on the degree of formation of an electromagnetic field.

Also, one or more carbon receptor reactors may be used depending on a size of the microwave cavity chamber. For example, 1 to 100 carbon receptor reactors may be used within the microwave cavity chamber.

A carbon receptor is fixed at an intermediate position within the carbon receptor reactor 300, and the carbon receptor may use carbon-based materials such as dewatered sludge char, activated carbon, bio-char, graphite, and carbon black solely or in combination thereof.

The injecting gas may be one or more kinds of biogases selected from the group consisting of $CH_4$ and $CO_2$, and the reforming gas may be $H_2$ and CO gases.

Reforming Mechanism of Carbon Receptor

Methane and carbon dioxide which are greenhouse gases and main ingredients in a biogas or a product gas have a microwave reforming mechanism as illustrated in FIG. 5.

A carbon gasification reaction in which only carbon dioxide is supplied and reformed with a carbon receptor is as exhibited in the following Formula 1. In this reaction, carbon (C) as a carbon receptor component is converted into carbon monoxide by reaction with carbon dioxide ($CO_2$).

$$C_{C/MR} + CO_2 \Rightarrow 2CO \qquad (1)$$

This is converted into methane and hydrogen and a part thereof is converted into carbon by a mechanism of a thermal decomposition reaction as exhibited in the following Formula 2. The converted carbon is adsorbed to an active center on a surface of the receptor, and, thus, the thermal decomposition reaction is gradually decreased.

$$CH_4 \Rightarrow C + 2H_2 \qquad (2)$$

The above-described thermal decomposition reaction is a homogeneous reaction and the carbon receptor containing a catalytic component is a dielectric solid for absorbing microwaves and thus activates a catalytic reaction. Further, microplasma is generated on a receptor bed and thus maintains a high temperature. Therefore, an ambient gas is improved in reactivity due to the high temperature, and particularly, the thermal decomposition reaction exhibited in Formula 2 is more so.

The problem of deposition of carbon generated when methane is reformed (refer to FIG. 2) on the active center can be reduced by carbon gasification using carbon dioxide as exhibited in the following Formula 3. It has been reported that such cleaning of the active center can be achieved by steam gasification. Further, such cleaning can be achieved more effectively by a microwave method in which microplasma is generated within a carbon receptor bed than by a conventional heating method.

$$C_{CH4}+CO_2 \Rightarrow 2CO \quad (3)$$

Further, steam may be supplied, and, thus, the adsorbed carbon can be reduced by a water-gas reaction as exhibited in the following Formula 4.

$$C_{CH4}+H_2O \rightarrow CO+H_2 \quad (4)$$

Gas Reforming Method

The present disclosure provides a method for reforming a gas, including:

supplying an injecting gas together with an inert gas to the microwave reforming apparatus according to the present disclosure (process 1); and obtaining a reforming gas by irradiating microwaves from the microwave reforming apparatus and reforming the supplied injecting gas (process 2).

The injecting gas may be one or more kinds of biogases selected from the group consisting of $CH_4$ and $CO_2$, and the reforming gas may be $H_2$ and CO gases.

The inert gas in the process 1 may be $N_2$ and Ar gases.

While one or more kinds of biogases selected from the group consisting of $CH_4$ and $CO_2$ are reformed at the same time, carbon which is generated at the time of thermal decomposition of methane ($CH_4$) and adsorbed to a carbon receptor and thus decreases catalytic activity can be cleaned by carbon gasification using carbon dioxide. Therefore, reforming can be continuously performed.

Gas Reforming System

The present disclosure provides a gas reforming system including: a gas supply unit configured to supply a product gas or a biogas generated when a source material including biomass, organic waste, and fossil fuel is pyrolyzed or gasified; and a gas reforming unit including the microwave reforming apparatus according to the present disclosure and configured to communicate with the gas supply unit.

The product gas may be a tar-containing gas, and if the tar-containing gas is supplied, tar may be reformed into one or more gases selected from the group consisting of hydrogen, carbon monoxide or a light hydrocarbon gas.

The biogas gas may be one or more selected from the group consisting of $CH_4$ and $CO_2$, and if the biogas is supplied, it can be reformed into $H_2$ and CO gases.

Method for Reforming Tar in Tar-Containing Gas

The present disclosure provides a method for reforming tar in a tar-containing gas, including: pyrolyzing or gasifying fossil fuel, biomass, or organic waste (process 1); supplying a tar-containing gas produced in the process 1 to the microwave reforming apparatus according to the present disclosure (process 2); and reforming tar in the supplied tar-containing gas into one or more gases selected from the group consisting of hydrogen, carbon monoxide or a light hydrocarbon gas by irradiating microwaves from the microwave reforming apparatus (process 3).

Tar Reforming Reduction

Tar is a representative product generated at the time of pyrolysis/gasification of carbon into hydrocarbon aggregate with $C_6$ or more. Most of tar is included in a product gas, and, thus, if the product gas is used, it may cause damage to the apparatus and a problem with operation during transfer and operation. Therefore, this material formed of hydrocarbon and present as a liquid or solid at room temperature may be reformed with microwaves to be converted into a room temperature gas such as light hydrocarbon, and carbon monoxide, and thus to be used as a gas fuel. This reduction mechanism can be represented by tar pyrolysis as exhibited in the following Formula 5.

$$Tar \rightarrow wH_2+xCO+yCO_2+zCnHm \quad (5)$$

Further, tar converted into light hydrocarbon can be converted into hydrogen by thermal cracking as exhibited in the following Formula 6.

$$pCnHx \rightarrow qCmHy+rH_2 \quad (6)$$

If carbon dioxide is supplied as a reforming additive at the time of tar reforming, it can be converted into hydrogen and carbon monoxide by tar dry reforming, and a mechanism thereof is as exhibited in the following Formula 7.

$$CnHx+nCO_2 \rightarrow (x/2)H_2+2nCO \quad (7)$$

Hereinafter, the present disclosure will be described in more detail with reference to the following Examples. However, the following Examples are illustrative only but do not limit the present disclosure.

Example

Sludge char produced by pyrolyzing dewatered sludge generated from a sewage treatment plant and commonly used activated carbon were used as microwave carbon receptors (MCRs) to obtain reforming characteristics. A process and a result of the experiment are as follows.

1) Experimental System

An experimental system for microwave heating reforming used in the present study was laboratory scale and included a microwave reformer, a gas and tar feed line, a monitoring & control equipment, and a sampling & analysis line as illustrated in FIG. 6.

FIG. 6 illustrates an experimental system for microwave reforming according to the present disclosure.

Specifically, the microwave reformer is configured as a quartz tube carbon receptor reactor (CRC) provided vertically within a multimode-microwave cavity oven with a power capacity of 2 kW. A carbon receptor sample basket was separately provided to be variable up and down in the quartz tube reactor, and, thus, a receptor sample could be introduced into and discharged from the reactor. A temperature of the reformer could be set up to 1,000° C. and was finely controlled by a controller connected to a thermocouple (k-type, diameter of 2 mm) in a microwave catalytic receptor. Further, a temperature change within a carbon receptor was continuously monitored by a data logger (Model Hydra data logger 2625A, Fluke, USA). A carbon receptor sample basket was separately provided to be variable up and down in the quartz tube reactor, and, thus, a receptor sample could be introduced into and discharged from the reactor.

The gas and tar feed line supplied carbon dioxide ($CO_2$) and methane which are reforming gases as mimic reforming gases from a mixer through a carrier gas nitrogen ($N_2$) cylinder and MFCs (BRONKHORST, F201AC-FAC-22-V, Netherlands) for flow control of the respective gases, and tar was supplied as mimic tar (benzene) by a tar generator through a carrier gas nitrogen ($N_2$) cylinder and steam was supplied to a reactor with tar through a heating line without condensation after a predetermined amount of water was supplied to a syringe pump (KD SCIENTIFIC, KDS-100, USA) and then evaporated.

A LabVIEW (Model LabVIEW 8.6, National Instrument, USA) was used as the monitoring & control equipment to control a gas flow rate and continuously monitor a temperature.

The sampling & analysis line included a glass wool filter for removing soot and moisture, an impinge injected with calcium chloride, and a cooler (ECS-30SS, Eyela Co., Japan) and was connected to a GC-TCD (CP-4900, Varian, Netherland) for reforming product gas analysis and to a GC-FID (14B, Shimadzu, Japan) for tar analysis.

2) Experimental Method

A microwave heating reforming experiment is a process in which the quartz tube reactor is heated by irradiating microwaves into a microwave carbon receptor in the sample basket positioned within the quartz tube reactor provided in the MW reformer and a mimic gas or mimic tar is supplied into the quartz tube reactor and then reformed passing through the receptor layer and the reformed gas is collected and analyzed.

The used carbon receptor was sieved to 1 to 3 mm and 15 g of the carbon receptor was newly put into the sample basket for each experiment and positioned at the center of the quartz tube reactor. Then, the mimic gas was supplied uniformly in a total amount of 75 ml/min so as to maintain a constant volumetric hourly space velocity (VHSV) of 0.3 L/g·h. Further, the mimic tar was supplied uniformly in a total amount of 250 ml/min at a constant VHSV of 1.875 L/g·h. Microwave power supply was initially set up with 2 kW, and after the sample temperature was linearly increased, gas reforming was uniformly maintained at a reference set temperature of 900° C. and tar reforming was uniformly maintained at 500 to 850° C.

In the gas reforming experiment, the characteristics of the catalytic receptor and the mimic gas were found out at the fixed reforming temperature and VHSV. A reforming characteristic experiment was conducted to each of three cases of two kinds of carbon receptors including microwave pyrolysis product sludge char and activated carbon with 25% $CO_2$, 25% $CH_4$, and 12.5% $CO_2$ and $CH_4$ each. Except $CO_2$ and $CH_4$ as the main ingredients of the mimic gas, the remaining balance was an inert gas $N_2$.

In the tar reforming experiment, commonly used activated carbon was used as a carbon receptor and a total amount of gas supplied was set to 250 mL/min (carrier gas ($N_2$) for every experiment was fixed to 170 mL/min; supplied in an amount of 80 mL/min for each of tar cracking (nitrogen), carbon dioxide gasification ($CO_2$), and steam gasification ($H_2O$ (g)) experiments), and a reactor temperature was set to 750° C. and the amount of benzene ($C_6H_6$) was set to 13 mL/min (concentration: 5%).

At a predetermined distance of time from the beginning of the experiment, each of the gases was collected in a tedlar bag for gas collection and then gas components and tar were analyzed. The mimic injecting gas and the reforming gas were analyzed by GC-TCD and the mimic tar was analyzed by GC-FID. A molecular sieve 5A (80/100 mesh) was applied to $H_2$, $CH_4$, CO, $O_2$ and $N_2$ gases and a PoraPlot-Q column was applied to $CO_2$, $C_2H_4$ and $C_2H_6$, and $C_6H_6$ was analyzed by a ZB-5 column.

SEM (Model S-4800, Hitachi Co., Japan) analysis was performed to find out physical properties before and after microwave carbon receptor reforming.

The conversion of $CO_2$, $CH_4$ and tar (benzene) as main target gases for reforming was calculated as exhibited in the following Equations 8, 9, and 10.

$$CH_4 \text{conversion} (\%) = 100 \cdot [(H_2)_{out}/2]/[(CH_4)_{out} + (H_2)_{out}/2] \quad (8)$$

$$CO_2 \text{conversion} (\%) = 100 \cdot [(CO)_{out}/2]/[(CO_2)_{out} + (CO)_{out}/2] \quad (9)$$

$$C_6H_6 \text{ conversion} (\%) = 100 \cdot [(C_6H_6)_{in} - (C_6H_6)_{out}]/(C_6H_6)_{in} \quad (10)$$

Herein, $(CH_4)_{out}$, $(H_2)_{out}$, $(CO_2)_{out}$, $(CO)_{out}$, and $(C_6H_6)_{out}$ refer to the concentrations of methane, hydrogen, carbon dioxide, carbon monoxide, and benzene, respectively, measured at an outlet of the microwave heating reformer, and $(C_6H_6)_{in}$ refers to the concentration of benzene measured at an inlet.

3) Experimental Result

A microwave carbon receptor used in the present study was produced from dewatered sewage sludge having a moisture content of 82% using nitrogen as a carrier gas in an electrical pyrolysis furnace which is a conventional heating system while maintaining a reactor temperature at 900° C.

a) Gas Reforming

① Effect on Gas Properties

In order to find out microwave heating reforming characteristics for carbon receptor of methane and carbon dioxide which are greenhouse gases, reforming characteristics for each of three cases of carbon dioxide reforming, methane reforming, and methane-carbon dioxide mixed gas reforming were found out.

Carbon Dioxide Reforming Characteristics

FIG. 7 is a graph illustrating a $CO_2$ conversion rate obtained when sludge char is used as a carbon receptor and only $CO_2$ is reformed with microwaves.

As illustrated in FIG. 7, as microwave reforming started, a $CO_2$ conversion rate sharply increased, and when a reforming time reached 60 minutes, the conversion rate reached the maximum of 67% and then gradually decreased. This is because carbon (C) as a carbon receptor component reacts with carbon dioxide so as to be converted into carbon monoxide in a carbon gasification reaction as exhibited in the following Formula 11. This can be seen from a decrease in concentration of $CO_2$ and an increase in concentration of CO during reforming.

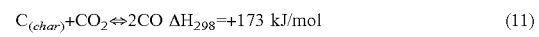

$$C_{(char)} + CO_2 \Leftrightarrow 2CO \quad \Delta H_{298} = +173 \text{ kJ/mol} \quad (11)$$

Unlike a conventional heating method in which heating is carried out by transferring a heating source from the outside, microwave heating is a method in which heating is carried out by transferring microwave energy into a receptor and converting kinetic energy caused by vibration of an object into heat energy. Therefore, microplasma is generated within a carbon receptor which is a dielectric solid, and, thus, a high temperature can be maintained at a specific position rather than a heat receptor bed. Thus, the gasification reaction (Formula 11) as a heterogeneous reaction is activated in this hot spot.

Methane Reforming Characteristics

FIG. 8 is a graph illustrating a $CH_4$ conversion rate obtained when sludge char is used as a carbon receptor and only $CH_4$ is reformed with microwaves.

As illustrated in FIG. 8, as a reforming time passed, a methane conversion rate sharply increased. When the reforming time reached 60 minutes, the conversion rate reached the maximum of 76% and then gradually decreased.

This is because methane is converted into hydrogen and a part thereof is converted into carbon by a mechanism of a thermal decomposition reaction as exhibited in the following Formula 12. It is known that the converted carbon is adsorbed onto a surface of the carbon receptor to decrease a porosity. Then, methane is converted into hydrogen and carbon monoxide by a partial oxidation reaction with remaining oxygen in a reactor and sludge char as exhibited in the following Formula 13.

This can be seen from the result that as the methane conversion rate increases, methane decreases and a concentration of hydrogen increases in an almost similar pattern and there is an increase by a small amount of carbon monoxide in the first half of reforming.

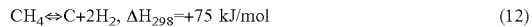

$$CH_4 \Leftrightarrow C + 2H_2, \Delta H_{298} = +75 \text{ kJ/mol} \tag{12}$$

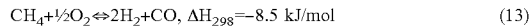

$$CH_4 + \tfrac{1}{2}O_2 \Leftrightarrow 2H_2 + CO, \Delta H_{298} = -8.5 \text{ kJ/mol} \tag{13}$$

The above-described thermal decomposition reaction (Formula 12) and the partial oxidation reaction (Formula 13) are gaseous homogeneous reactions. The carbon receptor containing a catalytic component is a dielectric solid for absorbing microwaves and thus activates a catalytic reaction. Further, as described above, microwave is generated on a receptor bed and thus maintains a high temperature. Therefore, an ambient gas is improved in reactivity due to the high temperature, and particularly, the thermal decomposition reaction exhibited in Formula 12 is more so.

After the methane conversion rate reached the maximum value, it gradually decreased in the latter half of the reaction. This is because carbon (C) generated in the thermal decomposition reaction exhibited in Formula 2 is adsorbed onto a surface of the receptor to suppress infiltration of methane which is a target gas for reforming through catalytic active pores of the carbon receptor and thus inhibit catalytic activity that promotes the thermal decomposition reaction.

As a result, a problem with the microwave heating methane reforming using a catalyst-containing receptor is that carbon generated in a thermal decomposition reaction of methane is adsorbed onto a surface of a catalytic receptor to inhibit the catalytic activity of the receptor. Similar results can be seen from other researcher's results of studies on various kinds of carbonaceous-based catalysts such as char, activated carbon, and carbon black.

Reforming Characteristics of Mixed Gas of Carbon Dioxide and Methane

The problem of deposition of carbon generated when methane is reformed (refer to Formula 12) on the active center of the catalytic receptor can be reduced by carbon gasification using carbon dioxide as exhibited in the following Formula 14. It has been reported that such cleaning of the active center can be achieved by steam gasification. Further, such cleaning can be achieved more effectively by a microwave method in which microplasma is generated within a carbon receptor bed than by a conventional heating method.

$$C_{(CH_4)} + CO_2 \Leftrightarrow 2CO \tag{14}$$

Therefore, in the present study, an experiment for finding reforming characteristics of a mimic mixed gas of $CH_4$ and $CO_2$ was conducted to confirm the above description, and a result of the experiment was as illustrated in FIG. 9.

FIG. 9 is a graph illustrating $CO_2$ and $CH_4$ conversion rates obtained when sludge char is used as a carbon receptor and a mixed gas of $CO_2$ and $CH_4$ is reformed with microwaves.

As illustrated in FIG. 9, after reforming started, methane conversion and carbon dioxide conversion were rapidly carried out and then such a state was maintained. As for a mixed gas, methane was first thermally decomposed (Formula 2) to generate hydrogen and carbon adsorbed on a surface of a receptor was reduced by carbon gasification (Formula 3) using carbon dioxide to generate carbon monoxide. Therefore, it can be seen that unlike the case where only carbon dioxide was supplied, a conversion rate of the mixed gas was not decreased over time.

In addition to the heterogeneous solid-gas reaction, carbon monoxide and hydrogen are generated by a dry reforming reaction which is a carbon dioxide gas homogeneous reaction as exhibited in the following Formula 15. Therefore, the mixed gas of methane and carbon dioxide has a higher conversion rate during reforming than each of methane and carbon dioxide.

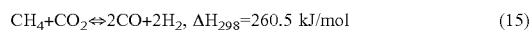

$$CH_4 + CO_2 \Leftrightarrow 2CO + 2H_2, \Delta H_{298} = 260.5 \text{ kJ/mol} \tag{15}$$

Easy conversion of methane and carbon dioxide in the mixed gas is determined to be caused by lower activation energy in the thermal decomposition reaction exhibited in Formula 4 than in the carbon gasification reaction exhibited in Formula 3.

The above-described conversion of the mixed gas can be seen from the result that as the microwave reforming proceeds, concentrations of methane and carbon dioxide decrease and concentrations of hydrogen and carbon monoxide increase.

FIG. 10 illustrates SEM images obtained before and after microwave reforming of sludge char.

As illustrated in FIG. 10A, in a conventional heating method, heat is transferred to the inside from the outside, and, thus, sludge char is converted into a carbon-containing porous material by evaporation and thermal decomposition of volatile matters present in sludge.

FIG. 10B is an enlarged photo illustrating thermally decomposable sludge char after reforming with a mixed gas of methane and carbon dioxide as a carbon receptor. In the microwave heating method, microwave energy is absorbed into the carbon receptor to carry out volumetric heating, and, thus, microplasma is locally generated. Therefore, a local hot spot is formed, and, thus, a surface of the carbon receptor is deformed to have a vitreous-like texture. Then, it can be seen that remaining adsorbed carbon which was generated by the thermal decomposition reaction (Formula 2) but not cleaned by the carbon gasification reaction (Formula 3) is present (in the left upper side in the photo) and carbon present as adsorbed around the active center is formed as converted into carbon nanofiber (in the right upper side in the photo).

The studies on carbon receptor reforming by the conventional electrical furnace method and the microwave heating method also exhibit similar results that carbon nanofiber is formed only by the microwave reforming method.

② Effect of Reformed Carbon Receptor

FIG. 11 is a graph illustrating $CO_2$ and $CH_4$ conversion rates obtained when activated carbon is used as a carbon receptor and a mixed gas of $CO_2$ and $CH_4$ is reformed with microwaves.

As illustrated in FIG. 11, after carbon dioxide and methane were rapidly converted in the beginning of reforming, each conversion continuously proceeded without a decrease. Although each gas started to be converted somewhat late in the beginning of reforming, a pattern was similar to the result of the experiment using sludge char as a carbon receptor as illustrated in FIG. 9. However, an activated carbon receptor has a relatively high methane conversion rate and a relatively low carbon dioxide conversion rate and thus seems to have a relatively low content of catalytic component that promotes a carbon gasification reaction. As the reforming proceeded, carbon dioxide and methane decreased and carbon monoxide and hydrogen which are reforming products increased.

In the whole reforming process, the two cases where activated carbon was used and where sludge char was used as a carbon receptor are similar in reforming pattern, but concentrations of hydrogen and carbon monoxide were higher in the case where sludge char was used as a carbon receptor. The sludge char carbon receptor had a heating value of 12.19 MJ/m$^3$ higher than 11.47 MJ/m$^3$ of the activated carbon receptor.

③ Effect of Reforming Temperature

FIG. 12 illustrates a result of reforming a mixed gas of carbon dioxide and methane when a reforming temperature which is a temperature of a carbon receptor bed is set to 800° C.

As illustrated in FIG. 12, after reforming started, conversion of carbon dioxide and methane slightly increased and then slightly decreased. The degree of conversion was relatively very low as compared with the case where the reforming temperature was 900° C. as illustrated in FIG. 9. This is because the carbon gasification reaction for carbon dioxide reforming as exhibited in Formula 11 and the thermal decomposition reaction for methane reforming as exhibited in Formula 12 decrease due to a decrease in reaction temperature. Further, conversion after the reforming was relatively decreased. This may be because cleaning of the active center as exhibited in Formula 14 is not well carried out, and, thus, carbon adsorbed on a surface of the carbon receptor inhibits catalytic action of the active center.

FIG. 13 is a photo exhibited a carbon receptor bed and local generation of microplasma occurring at the time of reforming.

As illustrated in FIG. 13, it can be seen that microplasma is generated insignificantly as compared with the case the reforming temperature was 900° C. Thus, it can be seen that it is relatively difficult to perform the above-described reforming reaction and active center cleaning.

④ Effect of Residence Time of Receptor

FIG. 14 illustrates a result of a mixed gas when a volumetric hourly space velocity of a carbon receptor bed layer is set to 0.9 L/gh.

As illustrated in FIG. 14, a reforming pattern was generally similar to the result of mixed gas reforming performed at a volumetric hourly space velocity of 0.3 L/g·h as illustrated in FIG. 9. However, since a residence time on the carbon receptor bed was relatively short, conversion rates of carbon dioxide and methane were somewhat low and concentrations of hydrogen and carbon monoxide as reforming product gases were also low.

FIG. 15 is a photo illustrating local generation of microplasma occurring in a carbon receptor.

As illustrated in FIG. 15, local generation of microplasma occurring in a carbon receptor was relatively insignificant. This is consistent with the above-described result of a decrease in conversion rate and concentrations of product gases.

b) Tar Reforming

In order to find out effects of tar decomposition and reforming additives, conversion rates, a H$_2$/CO ratio, concentrations of product gases, and higher heating values were measured when carbon dioxide and steam were applied as additives in terms of the use of carbon dioxide as a main greenhouse gas and surplus steam in a workplace, and a result thereof was as illustrated in FIG. 16 and FIG. 17.

FIG. 16 is a graph illustrating a tar conversion rate and a H$_2$/CO ratio depending on a CO$_2$—H$_2$O ratio for reduction of tar at the time of tar reforming using activated carbon as a carbon receptor.

As illustrated in FIG. 16, when carbon dioxide and steam were simultaneously supplied and conversion was carried out via tar reforming, a tar conversion rate was 97% at the amount of steam of 15%. When the amount of steam increased, the tar conversion rate slightly decreased, and when the amount of steam reached 70%, the tar conversion rate was 96%.

When carbon dioxide and steam were simultaneously supplied, benzene of tar was converted into carbon monoxide and hydrogen mainly by the above-described carbon reforming (Formula 16) and a steam reforming reaction (Formula 18) using steam.

$$C_6H_6+6CO_2 \leftrightarrow 12CO+3H_2 \qquad (16)$$

$$C_6H_6+6H_2O \leftrightarrow 6CO+9H_2 \qquad (17)$$

The tar conversion decreased as the amount of steam increased. This is because more steam physically infiltrate into pores deep in the carbon receptor and a steam gasification reaction as exhibited in the following Formula 18 is further activated and a tar decomposition steam reforming reaction is relatively depressed.

$$C+H_2O \leftrightarrow CO+H_2 \qquad (18)$$

FIG. 17 is a graph illustrating a concentration of a product gas and a higher heating value depending on a CO$_2$—H$_2$O ratio for reduction of tar at the time of tar reforming using activated carbon as a carbon receptor.

As illustrated in FIG. 17, concentrations of hydrogen and carbon monoxide as product gases increased as the amount of steam increased. However, carbon monoxide slightly decreased by a water-gas shift reaction as exhibited in the following Formula 19. This can also be seen from the concentrations of product gases and a further increase in H$_2$/CO ratio exhibited qualities of the product gases.

$$CO+H_2O \leftrightarrow CO_2+H_2 \qquad (19)$$

As described above, microplasma is locally generated on a carbon receptor bed, and, thus, a high-temperature area is present. Therefore, a homogeneous reaction which is a gaseous reaction of gas-gas and a heterogeneous reaction which is a reaction of solid-gas on surfaces of pores are simultaneously carried out.

As illustrated in FIG. 16, a tar conversion rate had the highest value of 99% when only tar cracking was carried out. When only carbon dioxide was supplied, the tar conversion rate was 98.5%, and when carbon dioxide and steam are simultaneously supplied, the tar conversion rate was in the range of 95 to 97%. Also, when only steam was supplied, the tar conversion rate had a lower value of 94%. When tar conversion reforming was carried out with simultaneous addition of carbon dioxide and steam, tar decomposition and reforming decomposition reactions were somewhat delayed due to tar cracking and complicated secondary reactions of products generated by the tar cracking as compared with the case where only cracking was carried out. However, when only tar cracking was carried out without addition of reforming additives, thermal decomposition was carried out by microplasma generated in the carbon receptor bed, and, thus, the amount of hydrogen generated is relatively small as compared with the case where tar conversion reforming was carried out. When tar conversion reforming was carried out with addition of steam only, tar conversion was carried out mainly by a steam reforming reaction, which resulted in the lowest value. The amount of hydrogen generated was increased due to steam, and, thus, a Hz/CO ratio was 1.7 which was the highest value except for 7 from tar cracking.

As illustrated in FIG. 17, a heating value of the product gases was the highest at 15 $MJ/m^3$ when cracking was carried out and the lowest at 4 $MJ/m^3$ when only carbon dioxide was supplied. Further, when carbon dioxide and steam were simultaneously supplied, the heating value of the product gases was about 9 to 9.3 $MJ/m^3$, and when only steam was supplied, the heating value of the product gases was in the middle at 8.7 $MJ/m^3$.

As a result, it is advantageous to perform only tar cracking in terms of tar conversion and heating values of product gases, and it is preferable to perform steam reforming conversion in terms of qualities of product gases. However, it is deemed to be advantageous to supply carbon dioxide and steam as reforming additives in the present study at an appropriate ratio in terms of tar conversion and qualities of product gases.

CONCLUSIONS

Microwave reforming characteristics were studied in order to convert a biomass pyrolysis or gasification gas and methane ($CH_4$) and carbon dioxide ($CO_2$) as main components of biogas into a high-quality fuel energy and also solve the greenhouse gas problem.

Microwave reforming was performed with application of a carbon receptor and reforming characteristics of each of carbon monoxide and methane were found out. As a result, carbon monoxide was generated from carbon monoxide by carbon gasification and hydrogen and carbon were generated from methane by thermal decomposition. In this case, carbon was adsorbed on an activated center of the carbon receptor and thus reduced conversion of the reforming gas.

When microwave reforming was performed to a mixed gas of carbon monoxide and methane, carbon was generated at the time of methane reforming and then adsorbed on a receptor and inhibited catalytic activity. However, cleaning was carried out by thermal decomposition reforming of methane, and, thus, uniform reforming conversion was continuously maintained.

When commonly used activated carbon was used as a carbon receptor, the amounts of hydrogen and carbon monoxide were smaller due to relatively low catalytic activity than when sludge char was used as a carbon receptor, and, thus, a heating value was low. Further, it was confirmed that a conversion rate and a yield of product gas were low when a receptor bed had a low temperature and a residence time on the bed was short.

Further, microwave reforming characteristics were studied by supplying carbon dioxide as a reforming additive in order to convert tar (benzene, $C_6H_6$) included in a product gas at the time of pyrolysis or gasification of biomass, fossil fuels, and waste into a light hydrocarbon gas and also solve the greenhouse gas problem.

At the time of tar reforming via microwave reforming using commonly used activated carbon as a carbon receptor, when carbon dioxide and steam were used as reforming additives, tar was converted into carbon monoxide and hydrogen. It was confirmed that when tar reforming was carried out by supplying carbon dioxide and steam at an appropriate ratio, a tar conversion rate, heating values of product gases, and qualities of the product gases could be improved in terms of reduction of carbon dioxide which is a greenhouse gas.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

EXPLANATION OF REFERENCE NUMERALS

100: Microwave cavity chamber
200: Magnetron
300: Carbon receptor reactor
400: Injecting gas supply unit
500: Reforming gas discharge unit

What is claimed is:

1. A microwave reforming apparatus for gas reforming, the microwave reforming apparatus comprising:
    a microwave cavity chamber;
    one or more magnetrons provided on an internal wall surface of the microwave cavity chamber;
    a power supply unit connected to the magnetron;
    one or more carbon receptor reactors positioned within the microwave cavity chamber;
    an injecting gas supply unit communicating with an upper part of the carbon receptor reactor; and
    a reforming gas discharge unit communicating with a lower part of the carbon receptor reactor.

2. The microwave reforming apparatus for gas reforming of claim 1, wherein the injecting gas includes one or more kinds of biogases selected from the group consisting of CH4 and CO2.

3. The microwave reforming apparatus for gas reforming of claim 1, wherein the reforming gas includes H2 and CO gases.

4. The microwave reforming apparatus for gas reforming of claim 1, wherein the carbon receptor reactor has a cylindrical shape or a square pillar shape.

5. The microwave reforming apparatus for gas reforming of claim 4, wherein a carbon receptor is fixed at an intermediate position within the carbon receptor reactor.

6. The microwave reforming apparatus for gas reforming of claim 5, wherein the carbon receptor includes one or more kinds selected from the group consisting of dewatered sludge char, activated carbon, bio-char, graphite, and carbon black.

7. A method for reforming a gas, the method comprising:
    supplying an injecting gas together with an inert gas to a microwave reforming apparatus of claim 1; and
    obtaining a reforming gas by irradiating microwaves from the microwave reforming apparatus and reforming the supplied injecting gas.

8. The method for reforming a gas of claim 7, wherein the injecting gas includes one or more kinds of biogases selected from the group consisting of $CH_4$ and $CO_2$.

9. The method for reforming a gas of claim 8, wherein when one or more biogases selected from the group consisting of $CH_4$ and $CO_2$ are simultaneously reformed, carbon which is generated by thermal decomposition of methane ($CH_4$) and adsorbed on the carbon receptor of the microwave reforming apparatus and inhibits catalytic activity is cleaned by a carbon gasification reaction of carbon dioxide, and, thus, reforming is performed continuously.

10. The method for reforming a gas of claim 7, wherein the reforming gas includes $H_2$ and CO gases.

11. A gas reforming system comprising:
a gas supply unit configured to supply a product gas or a biogas generated when a source material including biomass, organic waste, and fossil fuel is pyrolyzed or gasified; and
a gas reforming unit including a microwave reforming apparatus of claim 1 and configured to communicate with the gas supply unit.

12. The gas reforming system of claim 11, wherein the product gas is a tar-containing gas.

13. The gas reforming system of claim 12, wherein if the tar-containing gas is supplied, tar is reformed into one or more gases selected from the group consisting of hydrogen, carbon monoxide or a light hydrocarbon gas.

14. The gas reforming system of claim 11, wherein the biogas includes one or more kinds selected from the group consisting of $CH_4$ and $CO_2$.

15. The gas reforming system of claim 14, wherein if the biogas is supplied, the biogas is reformed into $H_2$ and CO.

16. A method for reforming tar in a tar-containing gas, the method comprising:
pyrolyzing or gasifying fossil fuel, biomass, or organic waste;
supplying a tar-containing gas produced by the pyrolyzed or gasified fossil fuel, biomass, or organic waste to a microwave reforming apparatus of claim 1; and
reforming tar in the supplied tar-containing gas into one or more gases selected from the group consisting of hydrogen, carbon monoxide or a light hydrocarbon gas by irradiating microwaves from the microwave reforming apparatus.

* * * * *